(12) United States Patent
Chen et al.

(10) Patent No.: US 8,339,123 B2
(45) Date of Patent: Dec. 25, 2012

(54) PORTABLE ELECTRONIC DEVICE WITH ELECTRONIC COMPASS AND METHOD FOR CALIBRATING COMPASS

(75) Inventors: Tsan-Yuan Chen, Taoyuan County (TW); Yu-Peng Lai, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 948 days.

(21) Appl. No.: 12/343,416

(22) Filed: Dec. 23, 2008

(65) Prior Publication Data
US 2009/0167295 A1 Jul. 2, 2009

(30) Foreign Application Priority Data
Dec. 31, 2007 (TW) ................................ 96151638 A

(51) Int. Cl.
*G01R 35/00* (2006.01)
(52) U.S. Cl. .......................................... 324/202; 702/92
(58) Field of Classification Search .................. 324/202; 702/85, 92; 340/686.1
See application file for complete search history.

(56) References Cited

U.S. PATENT DOCUMENTS

| | | | |
|---|---|---|---|
| 5,067,573 A | 11/1991 | Uchida | |
| 7,324,906 B2* | 1/2008 | Sato et al. | 702/85 |
| 2005/0125108 A1 | 6/2005 | Kwon | |
| 2005/0150122 A1* | 7/2005 | Cho et al. | 33/356 |
| 2005/0258825 A1* | 11/2005 | Masuda et al. | 324/207.26 |
| 2006/0066295 A1* | 3/2006 | Tamura et al. | 324/202 |
| 2008/0309508 A1* | 12/2008 | Harmon | 340/686.1 |

FOREIGN PATENT DOCUMENTS

| | | |
|---|---|---|
| CN | 1651862 A | 8/2005 |
| JP | 20065540 A | 1/2006 |
| JP | 2007232415 A | 9/2007 |
| TW | I265301 | 11/2006 |
| WO | 2007086581 A1 | 8/2007 |

OTHER PUBLICATIONS

Office action mailed on Oct. 5, 2011 for the Taiwan application No. 096151638, filing date Dec. 31, 2007, p. 1-6.

* cited by examiner

*Primary Examiner* — Arleen M Vazquez
(74) *Attorney, Agent, or Firm* — Winston Hsu; Scott Margo

(57) ABSTRACT

A calibrating method for a portable electronic device having azimuth device such as an electronic compass is disclosed. The calibrating method can be achieved by checking at least one sensor in the portable device incorporating the electronic compass configured in the portable device, so as to effectively detect and verify a temporary abnormal magnetic field caused by a stylus movement. When the electronic compass detects an abnormal magnetic field, the operation status of the sensor is checked for any change existence. If the operation status of the sensors changes, the abnormal magnetic field is verified as a temporary magnetic filed due to the movement of the stylus, in which case the electronic compass passes the calibration and goes on detecting the geomagnetic field according to its default setting value.

14 Claims, 4 Drawing Sheets

PORTABLE ELECTRONIC DEVICE WITH ELECTRONIC COMPASS AND METHOD FOR CALIBRATING COMPASS

BACKGROUND OF THE INVENTION

1. Field of the Invention

The present invention relates to an electronic device and a method, and more particularly, to a portable electronic device with electronic compass and method for calibrating compass.

2. Description of the Prior Art

The advancement of integrated circuit and technology of electro-mechanical integration has led to the multiplicity of electronic products with navigation and positioning functions. In such field, electronic compass provides with what a traditional compass can do for personal portable devices such as car navigators, flying navigation, etc. One example of an electronic compass provides azimuth data, which can be presented by the angle change between the geomagnetic north and the target, as the main guidance. The electronic compass usually has one or more magnetometers, or a magnetic element capable of detecting a magnetic field, for detecting the surrounding geomagnetic field and provides guidance.

Such electronic compass is easy to be affected by the combinational magnetic field, including the geomagnetic field and other magnetic fields, and sometimes needs calibration to exclude any interference by surrounding magnetic field to ensure the ability to detect the geomagnetic field. Generally, those surrounding magnetic fields, such as the condition when the electronic compass is locating in a car, under a pylon, near an electrical facility with magnet, can cause an abnormal magnetic field that is many times in magnitude than the geomagnetic field and because of that, signal overflow occurs in the electronic compass. The electronic compass must widen the range of detection for obtaining a better geomagnetic signal, which also leads to the downgrade of precision. When the abnormal magnetic field vanishes, the electronic compass must first carry out calibration before narrowing the range of detection for high geomagnetic precision. The electronic compass may not function during calibration as well.

In many cases, such abnormal magnetic field is usually temporal and causes no effect to the electronic compass being away from a certain distance. Calibration for the electronic compass becomes needless under such condition. In the prior art, calibration for the electronic compass is determined to activate or not by checking the time of existence of the abnormal magnetic field. The electronic compass determines an abnormal magnetic field as temporal interference and ignores the calibration if the abnormal magnetic field vanishes after a predetermined time; otherwise, the calibration will be executed. Such solution often has limitation due to different situations. Additionally, for portable electronic devices that have navigating function such as personal digital assistant (PDA), mobile phone, smart phone, or global positioning system (GPS) device, more and more magnetic accessories such as the stylus are detachably configured at the portable electronic devices for convenience reason. High frequency pull-and-insert movement of such accessories on the portable electronic device, however, generates frequent abnormal magnetic field around. Calibration for electronic compass in such case is needed quite often.

SUMMARY OF THE INVENTION

The present invention provides a method for calibrating a magnetic detector in a portable device having a first sensor. The method comprises the steps of detecting a first magnetic field by the magnetic detector according to a setting value; checking if a operation status of the first sensor changes when a second magnetic field is detected by the magnetic detector and the strength of the second magnetic field is greater than a threshold value; and detecting the first magnetic field according to the setting value and outputting corresponding data by the magnetic detector according to the first magnetic field when the operation status of the first sensor changes.

The present invention also provides a portable electronic device. The portable electronic device comprises a housing, a magnetic detector, a magnetic element, and a first sensor. The magnetic detector is disposed inside the housing for detecting a first magnetic field according to a setting value. The magnetic element is disposed in the housing and capable of moving relative to the magnetic detector and being selectively positioned at a first position inside the housing. The magnetic element generates a second magnetic field to the magnetic detector when moving relative to the magnetic detector. The first sensor is disposed at the first position inside the housing and operates in a first operation status when the magnetic element is positioned at the first position and in a second operation status when the magnetic element is positioned out of the first position. When the operation status of the first sensor changes, the magnetic detector detects the first magnetic field according to the setting value and outputs corresponding data.

These and other objectives of the present invention will no doubt become obvious to those of ordinary skill in the art after reading the following detailed description of the preferred embodiment that is illustrated in the various figures and drawings.

DETAILED DESCRIPTION

The present invention configures a detector for detecting movement of a stylus or magnetic accessories in a portable electronic device having an electronic compass for determining if an abnormal magnetic field is temporal and if there is a need for calibration of the electronic compass. The portable electronic device in the present invention can be personal digital assistant (PDA), mobile phone, smart phone, or global positioning system (GPS) device that has navigating function.

Figure 1:
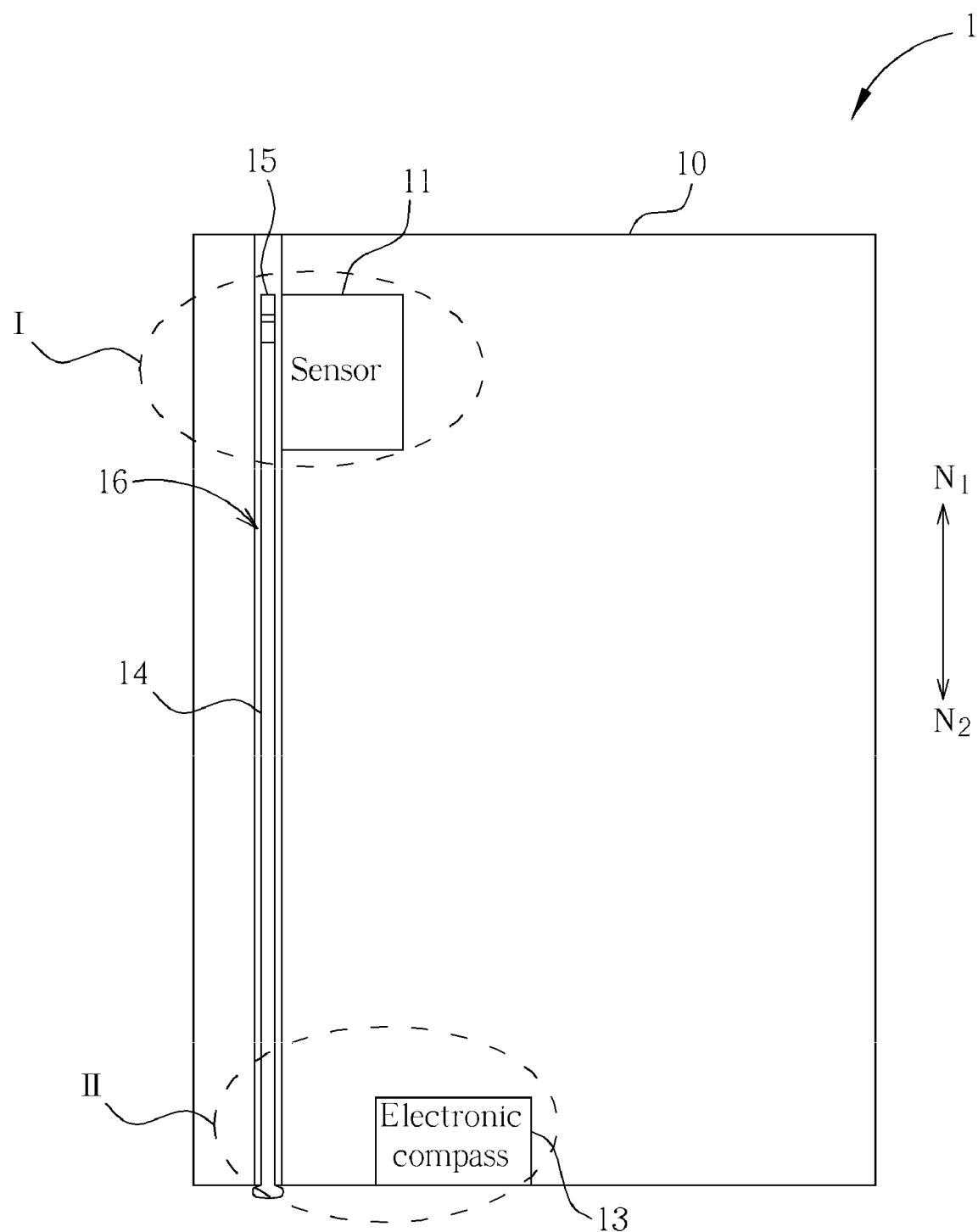
FIG. 1 is an illustration of a first embodiment of a portable electronic device capable of calibrating magnetic detector according to the present invention.

Please refer to FIG. 1. FIG. 1 is an illustration of a first embodiment of a portable electronic device 1 capable of calibrating magnetic detector according to the present invention. The portable electronic device 1 includes an electronic compass 13 disposed at a second position 11 inside a housing 10. The electronic compass 13 is set for detecting the geomagnetic field and provides azimuth data for the portable electronic device 1. In addition to the electronic compass 13, the calibrating method of the present invention can also be applied on any magnetic detector that is highly sensitive to change of magnetic field. The portable electronic device 1 further includes a magnetic stylus 14 (or magnetic accessories for the portable electronic device) that is contained in a container 16 inside the housing 10. The stylus 14 can move relative to the housing 10 and to the electronic compass 13 along direction N1 or N2 when a user pulls out the stylus 14 from the container 16 or inserts the stylus 14 into the container 16. The stylus 14 has a magnetic section 15 at one end (or the accessories are magnetic at one end or for the whole part) that forms a local magnetic field around. Since the electronic compass 13 is designed for detecting the geomagnetic field according to a predetermined setting value under the environment that the geomagnetic field can be normally detected, meaning no existence of other abnormal magnetic field, change of the magnetic field caused by the magnetic section 15 as the stylus 14 moves inside the container 16 can cause interference and signal overflow to the electronic compass 13 such that the electronic compass 13 is unable to correctly output the azimuth data.

The change of the magnetic field generated by the movement of the stylus 14 inside the container 16 should be viewed as temporal and predictable. A sensor 11 is disposed at a first position I of the portable electronic device 1, for which case in the embodiment the first position I is where a magnetic section 15 locates when the stylus 14 is totally inserted into the container 16. The sensor 11 can be sensor of mechanical type (such as a mechanical switch) or of electrical type (such as a Hall component capable of detecting magnetic field). When the magnetic section 15 of the stylus 14 is at the first position I, the sensor 11 is defined to operate in a first operation status, for example, an opened status for the mechanical switch or a status for the electrical type sensor that has sensed a magnetic magnitude greater than a threshold value. When the magnetic section 15 of the stylus 14 is away from the first position I, the sensor 11 is defined to operate in a second operation status, for example, a closed status for the mechanical switch or a status for the electrical type sensor that has sensed magnetic magnitude smaller than the threshold value. Therefore, whenever the magnetic section 15 moves to or moves away from the first position I, the sensor 11 is caused to have change in its operation status, from the first operation status to the second operation status or vice verse. The electronic compass 11 then views the detected abnormal magnetic field as a temporal and predictable change of magnetic field based on the status change of the sensor 11 and ignores following calibration process. After the abnormal magnetic field vanishes, i.e., the stylus 14 has totally left the housing 10 or completely inserted into the container 16, the electronic compass 13 goes on to detect the geomagnetic field according to the predetermined setting value and output azimuth data accordingly.

Figure 2:
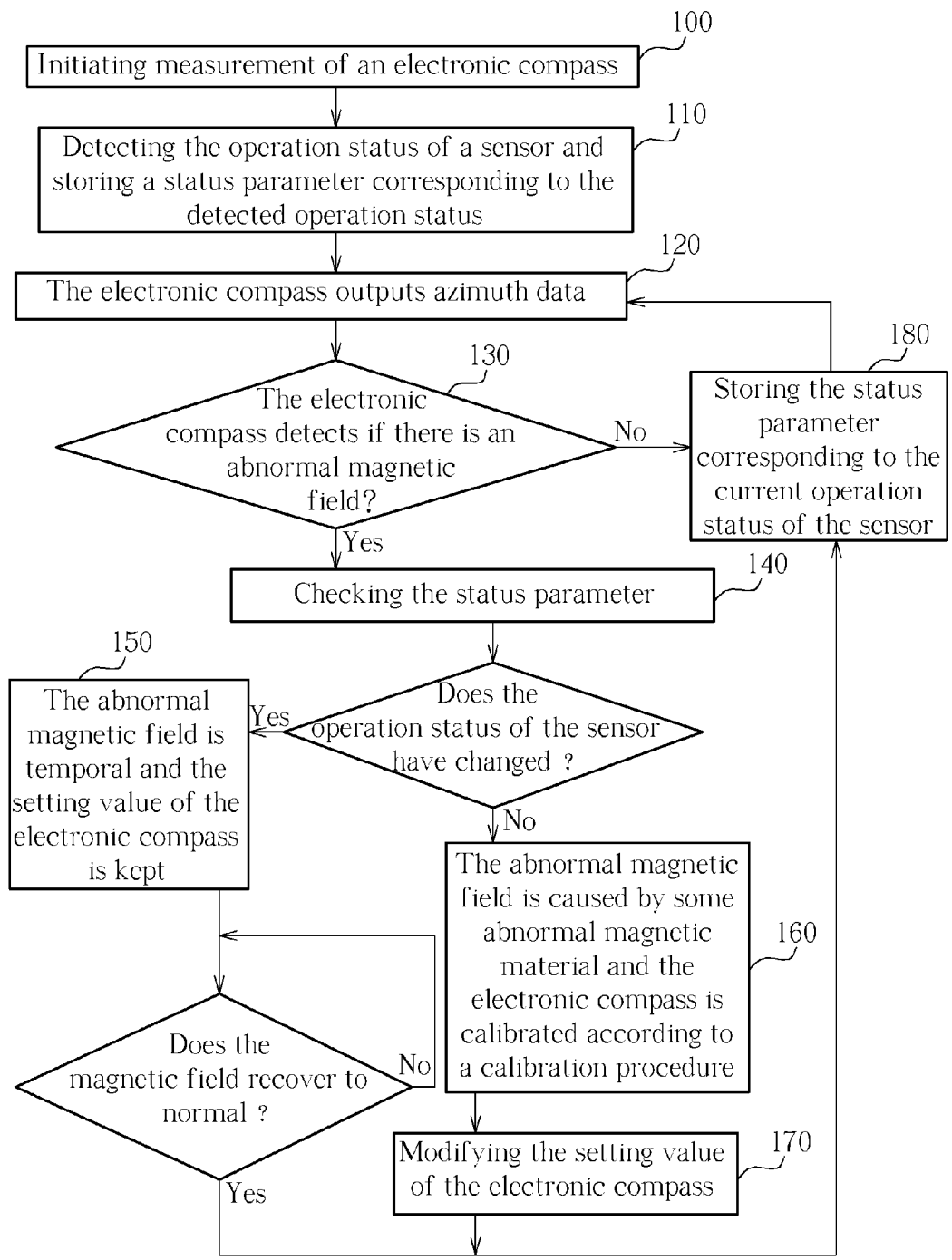
FIG. 2 is a flowchart of a calibrating method for an electronic compass of a portable electronic device according to the first embodiment of the present invention.

Please refer to FIG. 2. FIG. 2 is a flowchart of a calibrating method for the electronic compass 13 of the portable electronic device 1 according to the first embodiment of the present invention. The steps are as follows:

Step 100: initiating measurement of an electronic compass;

Step 110: detecting the operation status of a sensor and storing a status parameter corresponding to the detected operation status;

Step 120: the electronic compass detects the geomagnetic field according to a predetermined setting value and outputs azimuth data accordingly;

Step 130: the electronic compass detects if there is an abnormal magnetic field; if an abnormal magnetic field is detected, executing Step 140; otherwise, executing Step 180;

Step 140: checking the status parameter and determining if the operation status of the sensor has changed; if it has changed, executing Step 150; otherwise, executing Step 160;

Step 150: determining that the abnormal magnetic field detected in Step 130 is caused by the movement of a magnetic stylus (or other magnetic accessories) inside the electronic device, keeping the setting value of the electronic compass for detecting the geomagnetic field, and detecting if the magnetic field detected by the electronic compass recovers to be normal; if yes, executing Step 180;

Step 160: determining that the abnormal magnetic field detected in Step 130 is caused by some abnormal magnetic material in the surrounding and calibrating the electronic compass according to a calibration procedure;

Step 170: the electronic compass modifies the setting value according to a combination magnetic field of the geomagnetic field and the abnormal magnetic field;

Step 180: storing the status parameter corresponding to the current operation status of the sensor.

In Step 110, the initial operation status of the sensor 11, either the first operation status or the second operation status, is detected and a status parameter corresponding to the detected operation status is stored. When the electronic compass 13 detects an abnormal magnetic field as in Step 130, practically when the abnormal magnetic field is greater than the threshold value and causes signal overflow to the electronic compass 13, the electronic compass 13 then checks the status parameter and determines if the operation status of the sensor has changed, as described in Step 140. In Step 150, the electronic compass 13 keeps its setting value if the operation status of the sensor 11 has changed, which can be verified as the movement of the magnetic stylus 14 inside the housing 10. The electronic compass 13 then detects if the magnetic field recovers to be normal, or practically the magnitude of the abnormal magnetic field is smaller than the threshold value and no longer causes any signal overflow to the electronic compass 13, and goes back to Step 120 to detect the geomagnetic field according to the predetermined setting value and output azimuth data after the detected magnetic field turns to be normal.

In Step 150, there are two conditions that can make the surrounding magnetic field to recover to be normal: one is that the stylus 14 totally left the portable electronic device 1 and the other one is that the stylus 14 goes back to completely insert into container 16 such that the magnetic section 15 again locates in the first position I. For the latter condition, the operation status of the sensor 11 changes again. Either condition will require that in Step 180 to store the status parameter corresponding to the current operation status of the sensor 11 for follow-up status detection.

If the electronic compass 13 detects the abnormal magnetic field in Step 130 but no change in the operation status of the sensor 11 in Step 140, the abnormal magnetic field is then determined to be not a temporal and predictable magnetic field change and the electronic compass 13 needs to calibrate according to a calibration procedure, as described in Step 160. The setting value is further modified in Step 170 and then the electronic compass 13 can detect the geomagnetic field according to the modified setting value and output azimuth data accordingly.

Figure 3:
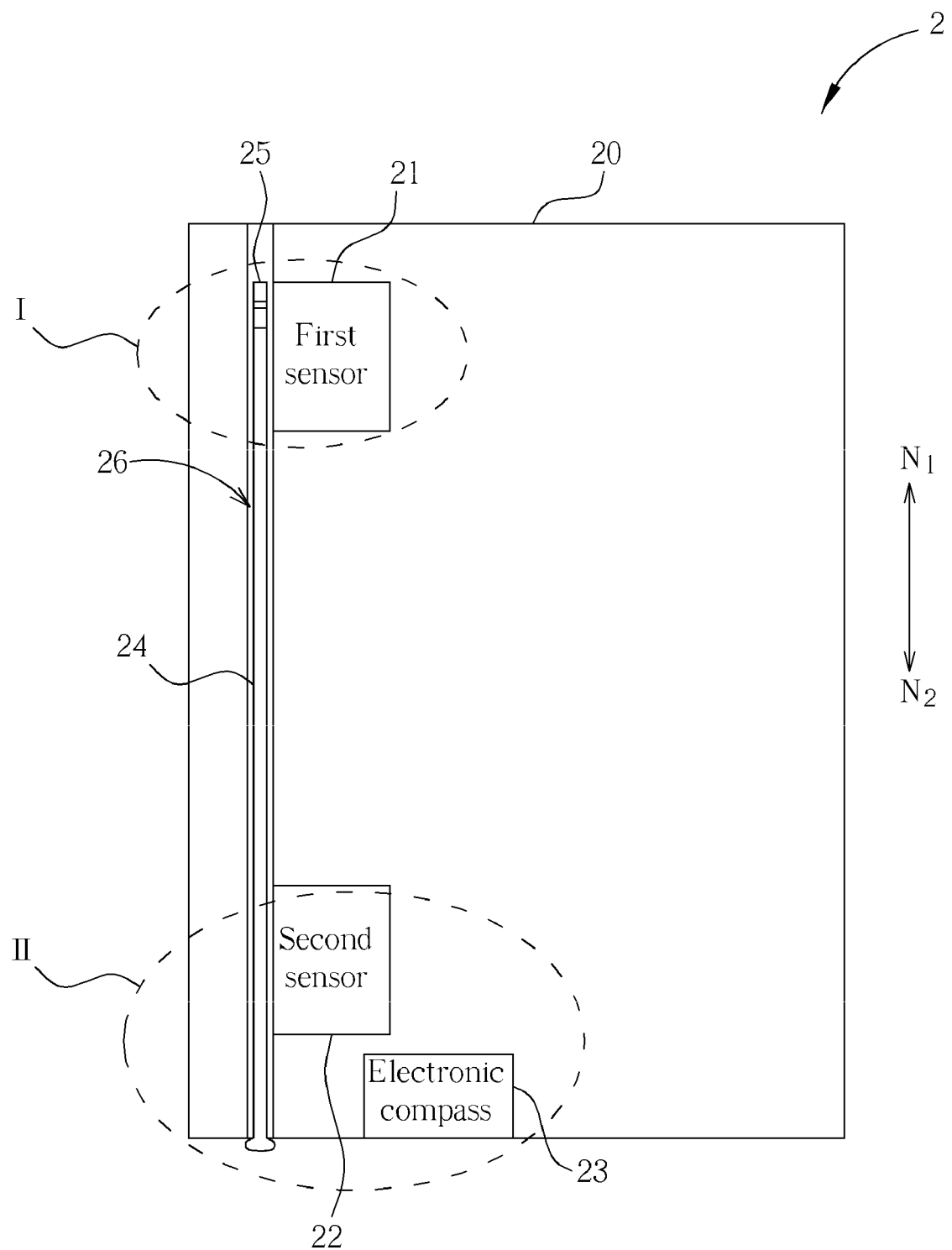
FIG. 3 is an illustration of a second embodiment of the portable electronic device capable of calibrating magnetic detector according to the present invention.

Please refer to FIG. 3. FIG. 3 is an illustration of a second embodiment of a portable electronic device 2 capable of calibrating magnetic detector according to the present invention. The portable electronic device 2 includes an electronic compass 23 disposed at a second position II inside a housing 20 and a stylus 24 contained in a container 26 inside the housing 20. The stylus 24 can move relative to the housing 20 and to the electronic compass 23 along direction N1 or N2 when the user pulls out the stylus 24 from the container 26 or inserts the stylus 24 into the container 26.

A first sensor 21 is disposed at a first position I of the portable electronic device 2, for which case in the embodiment the first position I is where a magnetic section 25 of the stylus 24 locates when the stylus 24 is totally inserted into the container 26. A second sensor 22 is disposed at the second position II. The first sensor 21 and the second sensor 22 can be sensors of mechanical type or of electrical type, such as a Hall component capable of detecting magnetic field. When the magnetic section 25 of the stylus 24 is at the first position I, the first sensor 21 is defined to operate in a first operation status and when the magnetic section 25 is away from the first position I, the first sensor 21 is defined to operate in a second operation status. When the magnetic section 25 of the stylus 24 is at the second position II, the second sensor 22 is defined to operate in a third operation status and when the magnetic section 25 is away from the second position II, the second sensor 22 is defined to operate in a fourth operation status. Since either the operation status of the first sensor 21 or the operation status of the second sensor 22 changes due to the movement of the magnetic section 25 of the stylus 24 moving in or away from the first position I or the second position II, the electronic compass 23 then views the detected abnormal magnetic field as temporal and predictable change of magnetic field based on the status change of the first sensor 21 or the second sensor 22 and ignores following calibration process. After the abnormal magnetic field vanishes, i.e., the stylus 24 has totally left the housing 20 or completely inserted into the container 26, the electronic compass 23 goes on to detect the geomagnetic field according to the predetermined setting value and output azimuth data accordingly.

Figure 4:
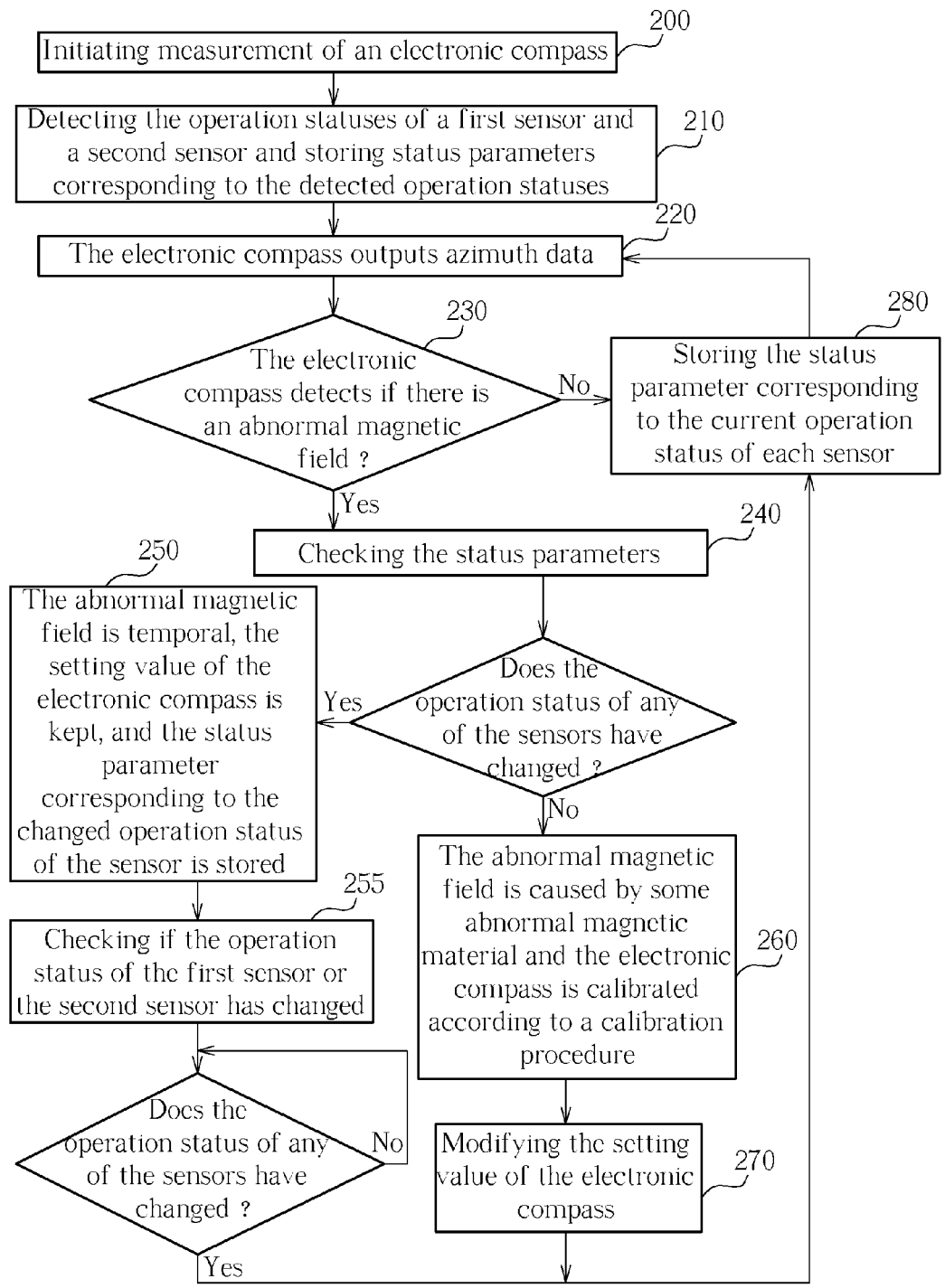
FIG. 4 is a flowchart of a second embodiment of the calibrating method for an electronic compass of a portable electronic device according to the second embodiment of the present invention.

Please refer to FIG. 4. FIG. 4 is a flowchart of a calibrating method for the electronic compass 23 of the portable electronic device 2 according to the second embodiment of the present invention. The steps are as follows:

Step 200: initiating measurement of the electronic compass;

Step 210: detecting the operation statuses of a first sensor and a second sensor and storing status parameters corresponding to the detected operation statuses;

Step 220: the electronic compass detects the geomagnetic field according to a predetermined setting value and outputs azimuth data accordingly;

Step 230: the electronic compass detects if there is an abnormal magnetic field; if an abnormal magnetic field is detected, executing Step 240; otherwise, executing Step 280;

Step 240: checking the status parameters and determining if the operation status of the first sensor or the second sensor has changed; if it has changed, executing Step 250; otherwise, executing Step 260;

Step 250: determining that the abnormal magnetic field detected in Step 230 is caused by the movement of a magnetic stylus (or other magnetic accessories) inside the electronic device, keeping the setting value of the electronic compass for detecting the geomagnetic field, and storing the status parameter corresponding to the changed operation status of the sensor;

Step 255: checking the status parameter and determining if the operation status of the first sensor or the second sensor has changed; if it has changed, executing Step 280;

Step 260: determining that the abnormal magnetic field is caused by some abnormal magnetic material in the surrounding and calibrating the electronic compass according to a calibration procedure;

Step 270: the electronic compass modifies the setting value according to a combination magnetic field of the geomagnetic field and the abnormal magnetic field;

Step 280: storing the status parameter corresponding the current status of each sensor.

In Step 210, the initial operation statuses, i.e. the first status or the second status, of the first sensor 21 and the initial operation statuses, i.e. the third status or the fourth status, of the second sensor 22 are detected, and status parameters corresponding to the detected operation statuses are stored. In Step 240, the electronic compass 23 then checks the status parameters and determines if the operation status of the first sensor 21 or the second sensor 22 has changed. If the status parameter corresponding to the operation status of the first sensor 21 has changed (maybe when the stylus 24 moves away from the container 26) or if the status parameter corresponding to the operation status of the second sensor 22 has changed (maybe when the stylus 24 moves into the container 26), which can be verified as the movement of the magnetic stylus 24 inside the housing 20, the electronic compass 23 will keep its setting value and stores the status parameter corresponding to the changed operation status of the sensor (Step 250). Afterwards, the electronic compass 23 then determines if the magnetic field recovers to be normal by checking if there is a follow-up change in the operation status of the sensor (Step 255).

For example, if the magnetic section 25 of the stylus 24 is moved away from the first position I along direction N2 when the pen 24 begins to leave the container 26, the first sensor 21 changes its operation status accordingly (Step 240) and a status parameter corresponding to the changed operation status is stored (Step 250). When the magnetic section 25 goes on to move to the second position II and then totally leaves the container 26, the second sensor 22 also changes its operation status (Step 255, actually the operation status of the second sensor 22 changes from the third operation status to the fourth operation status, and then from the fourth operation status back to the third operation status) such that the electronic compass 23 can verify that the stylus 24 has completely left the portable electronic device 2 and the abnormal magnetic field caused by the stylus 24 is no longer existing. The electronic compass 23 then detects the geomagnetic field according to the predetermined setting value and outputs azimuth data accordingly in Step 220. When the stylus 24 inserts into the container 26 from the second position II, the second sensor 22 changes its operation status accordingly (Step 240) and a status parameter corresponding to the changed operation status is stored (Step 250, actually the operation status of the second sensor 22 changes from the third operation status to the fourth operation status, and then from the fourth operation status back to the third operation status). When the magnetic section 25 goes on to move to the first position I along direction N1, the first sensor 21 also changes its operation status (Step 255) such that the electronic compass 23 can verify that the stylus 24 has completely inserted into the portable electronic device 2 and the abnormal magnetic field caused by the stylus 24 is no longer existing. The electronic compass 23 then detects the geomagnetic field according to the predetermined setting value and outputs azimuth data accordingly in Step 220. Additionally, as for the condition that the magnetic section 25 is moved away from the first position I along direction N2 (Step 240) and then moved backward to the first position I from a position before the second position II (Step 255) or that the magnetic section 25 inserts into the container 26 from the second position II (Step 240) and then returns to the second position II along the direction N2 from a position before the first position I and finally leaves away from the container 26 (Step 255), a sensor (the first sensor 21 or the second sensor 22) changes its operation status twice in sequence and the present invention can also apply on such condition. In order to properly use the status parameters for determining any change in operation statuses of the first sensor 21 and the second sensor 22, any condition mentioned above requires the operation statuses of the first sensor 21 and the second sensor 22 to be stored as corresponding status parameters in Step 280.

Additionally, since the electronic compass 13 in the first embodiment also serves as magnetic detection, the electronic compass 13 can provide magnetic detection function like the second sensor 22 does in the second embodiment. In addition, the detection by the extra second sensor 22 in the second embodiment can further lower the operational load of the electronic compass 23 and have higher control precision.

If the electronic compass 23 detects the abnormal magnetic field in Step 230 but no status change of the first sensor 21 or the second sensor 22 in Step 240, the abnormal magnetic field is then determined to be caused by some abnormal magnetic material in the surround, not by a temporal and predictable magnetic field change, and the electronic compass 23 needs to be calibrated according to a calibration procedure in Step 260. The setting value is further modified in Step 270 and then the electronic compass 23 detects the geomagnetic field according to the calibrated setting value and outputs azimuth data accordingly.

The calibrating method disclosed in the present invention can apply on a portable electronic device having azimuth device such as an electronic compass and be achieved by checking one or more mechanical or electrical sensors in the portable device incorporating the electronic compass configured in the portable device, so as to effectively detect and verify a temporary abnormal magnetic field caused by a stylus movement. When the electronic compass detects an abnormal magnetic field, the operation status of the sensor is checked for any change existence. If the operation status of the sensors changes, the abnormal magnetic field is verified as a temporary magnetic filed due to the movement of the stylus or magnetic accessory inside the device, in which case the electronic compass passes the calibration and goes on detecting the geomagnetic field according to its default setting value so that the number of times for calibrating the electronic compass is reduced.

Those skilled in the art will readily observe that numerous modifications and alterations of the device and method may be made while retaining the teachings of the invention.

What is claimed is:

1. A method for detecting a magnetic field using a magnetic detector in a portable device having a first sensor, the method comprising:
    detecting a first magnetic field by the magnetic detector according to a setting value;
    checking whether an operation status of the first sensor changes when a second magnetic field is detected by the magnetic detector and the strength of the second magnetic field is greater than a threshold value; and
    detecting the first magnetic field according to the setting value and outputting azimuth data by the magnetic detector according to the first magnetic field when the operation status of the first sensor changes;
    wherein the first magnetic field is generated by a first magnetic source and the second magnetic field is generated by a second magnetic source.

2. The method of claim 1, wherein the step of detecting the first magnetic field according to the setting value and outputting azimuth data when the operation status of the first sensor changes further comprises: checking whether the strength of the second magnetic field is smaller than the threshold value, and detecting the first magnetic field according to the setting value and outputting the azimuth data when the strength of the second magnetic field is smaller than the threshold value.

3. The method of claim 1, further comprising: calibrating the magnetic detector when the strength of the detected second magnetic field is greater than the threshold value and when the operation status of the first sensor does not change.

4. The method of claim 1, wherein the step of detecting the first magnetic field according to the setting value and outputting azimuth data is detecting geomagnetic field and outputting azimuth data according to the detected geomagnetic field.

5. The method of claim 1, wherein the portable device has a second sensor and the method further comprises:
    checking whether an operation status of the second sensor changes when the strength of the second magnetic field is greater than the threshold value; and
    detecting the first magnetic field according to the setting value and outputting azimuth data when the operation status of the second sensor changes.

6. The method of claim 5, wherein the step of detecting the first magnetic field according to the setting value and outputting azimuth data when the operation status of the second sensor changes further comprises:
    checking whether the strength of the second magnetic field is smaller than the threshold value, and detecting the first magnetic field according to the setting value and outputting azimuth data when the strength of the second magnetic field is smaller than the threshold value.

7. A portable electronic device, comprising:
    a housing;
    a magnetic detector disposed inside the housing for detecting a first magnetic field according to a setting value;
    a magnetic element disposed in the housing and capable of moving relative to the magnetic detector and being selectively positioned at a first position inside the housing, wherein the magnetic element generates a second magnetic field to the magnetic detector when moving relative to the magnetic detector; and
    a first sensor disposed at the first position inside the housing and operating in a first operation status when the magnetic element is positioned at the first position and in a second operation status when the magnetic element is positioned out of the first position;
    wherein when the operation status of the first sensor changes, the magnetic detector detects the first magnetic field according to the setting value and outputs corresponding data.

8. The portable electronic device of claim 7, wherein the magnetic detector is utilized for checking the second magnetic field when the operation status of the first sensor changes, and for detecting the first magnetic field according to the setting value and outputting the corresponding data when the strength of the second magnetic field is smaller than a threshold value.

9. The portable electronic device of claim 7, wherein the magnetic detector is calibrated when the strength of the detected second magnetic field is greater than a threshold value and when the operation status of the first sensor does not change.

10. The portable electronic device of claim 7, wherein the first magnetic field is geomagnetic field.

11. The portable electronic device of claim 7, further comprising a second sensor disposed at a second position inside the housing and operating in a third operation status when the magnetic detector is positioned at the second position and in a fourth operation status when the magnetic element is positioned out of the second position, wherein when the operation status of the second sensor changes, the magnetic detector detects the first magnetic field according to the setting value and outputs the corresponding data.

12. The portable electronic device of claim 11, wherein the first sensor and the second sensor are sensors of mechanical type or electrical type.

13. The portable electronic device of claim 7, wherein the magnetic detector is an electronic compass and the corresponding data is azimuth data.

14. The portable electronic device of claim 7, wherein the magnetic element is one section of a stylus.

\* \* \* \* \*